(12) United States Patent
Lee

(10) Patent No.: US 7,048,389 B2
(45) Date of Patent: May 23, 2006

(54) OPTICAL PROJECTION MODULE

(75) Inventor: Sea-Huang Lee, Miao-Li (TW)

(73) Assignee: Coretronic Corporation, Miao-Li (TW)

( * ) Notice: Subject to any disclaimer, the term of this patent is extended or adjusted under 35 U.S.C. 154(b) by 62 days.

(21) Appl. No.: 10/708,602

(22) Filed: Mar. 14, 2004

(65) Prior Publication Data
US 2004/0189958 A1 Sep. 30, 2004

(30) Foreign Application Priority Data
Mar. 28, 2003 (TW) .............................. 92205258 U

(51) Int. Cl.
G03B 21/14 (2006.01)
G03B 21/20 (2006.01)
G03B 21/22 (2006.01)
G03B 3/00 (2006.01)

(52) U.S. Cl. .................... 353/101; 353/84; 353/87; 353/119

(58) Field of Classification Search ................. 353/31, 353/84, 87, 100, 101, 119
See application file for complete search history.

(56) References Cited

U.S. PATENT DOCUMENTS

| 6,508,556 | B1 * | 1/2003 | Ueda ............................ 353/74 |
| 6,601,959 | B1 * | 8/2003 | Miyata et al. ................ 353/98 |
| 6,719,432 | B1 * | 4/2004 | Chen et al. ................... 353/74 |
| 6,762,870 | B1 * | 7/2004 | De Vaan ...................... 359/242 |
| 6,805,451 | B1 * | 10/2004 | Tzong et al. ................ 353/119 |
| 2003/0137611 | A1 * | 7/2003 | Chang et al. ............... 348/787 |

* cited by examiner

Primary Examiner—Melissa Jan Koval
(74) Attorney, Agent, or Firm—Winston Hsu

(57) ABSTRACT

An optical projection module includes a front optical module, a rear optical module and an adjustment member mounted between the front and rear optical modules. The front optical module includes a lighting module, an integrated rod and a color wheel. One end of the adjustment member is pivotally mounted to the front optical module, and the other end of the adjustment member is screwed on the rear optical module to form the optical projection module. By linear movement of the rear optical module actuated by rotation of the adjustment member along an optical axis, a relative position of the rear optical module and the front optical module is adjusted so that lights coming from the color wheel are clearly projected on a light valve with simplified digital signal processing, reduced loss of luminance and increased luminescence efficiency.

12 Claims, 4 Drawing Sheets

OPTICAL PROJECTION MODULE

BACKGROUND OF INVENTION

1. Field of the Invention

The invention relates to an optical projection module, and more particularly to an optical projection module having an adjustment structure.

2. Description of the Prior Art

Referring to FIG. 1A, a conventional optical projection system 10 of well-known sequential color recapture technology includes a light source 11, a reflector 12, an integrated rod 13, a color wheel 14, a set of illumination lens 15, a light valve 16, a projection lens 17 and a screen 18.

The color wheel 14 consists of a red filter R, a green filter G and a blue filter B arranged in a helix. The light source 11 provides a light beam that reflects by a reflector 12 and then enters into the integrated rod 13 to perform uniformization. The light beam is filtered into red light 141, green light 142 and blue light 143 after passing through the color wheel 14. The color lights 141, 142, 143 are respectively in the shape of rectangular stripes, as shown in FIG. 1B. The color lights converge on the illumination lens 15 and then travel through the light valve 16 for color image processing. Finally, lights are projected via the projection lens 17 to form an image on the screen 18.

The rectangular stripes of R, G and B color lights 141, 142, 143 are projected on the light valve 16 at the same time. Therefore, the light valve 16 needs to simultaneously process digital signals with respect to R, G and B color lights. Furthermore, there are connected areas between the lights so that the processing of the digital signals has to be highly loaded to generate a clear image from the light valve 16. Referring to FIG. 2, the conventional optical projection system is constructed by assembling individual optical elements into the corresponding signal module, for which careful consideration is to be taken in respect of the positioning of the optical elements and prevention of dusts. The optical elements such as the integrated rod 13, the color wheel 14 and the light valve 16 are fixedly mounted in the projection system. After assembling, the optical elements can't be move to adjust for positioning. However, production and assembly tolerances existing in the system adversely affect the precise focus of R, G, B lights coming from the color wheel 14 on the light valve 16. Thereby, the light beams are not so clear, and the areas between the light beams entering the light valve 16 overlap one another. Due to overlapped areas with various color lights, the processing of the digital signals becomes more complicated. In order to simplify the processing of the digital signals, the conventional projection system usually does not process digital signals at the overlapped areas, which significantly reduces luminance and thus reduces luminescence efficiency.

SUMMARY OF INVENTION

One object of the invention is to provide an optical projection module, in which the relative position of optical elements in the optical projection module is adjusted via an adjustment member.

Another object of the invention is to provide an optical projection module having an adjustment member to allow clear projection of lights from a color wheel on a light valve, thereby simplifying the processing of digital signals, preventing loss of luminance and increasing luminescence efficiency.

In order to achieve the above and other objectives of the invention, an optical projection module of the invention includes a front optical module, a rear optical module and an adjustment member mounted between the front and rear optical modules. The front optical module includes a light valve and a projection lens. The rear optical module includes a lighting module, an integrated rod and a color wheel. The front optical module and the adjustment member respectively have, at corresponding ends, an annular groove and a plurality of screw holes around an outer periphery of the adjustment member. The rear optical module has outer threads at an end thereof and the adjustment member has inner threads matching the outer threads of the rear optical module. One end of the adjustment member is pivotally mounted to the front optical module by inserting fasteners into the groove through the screw holes. Furthermore, with the engagement of the inner and outer threads, the other end of the adjustment member is screwed to the rear optical module. Thereby, the optical projection module is constructed. When the adjustment member rotates, it drives the rear optical module to linearly move along an optical axis by engagement of the inner threads of the adjustment member with the outer threads of the rear optical module. After the relative position of the front and rear optical modules is adjusted, lights passing through the color wheel are clearly projected on the light valve. Thereby, the digital signal processing is simplified with reduced loss of luminance and increased luminescence efficiency.

BRIEF DESCRIPTION OF DRAWINGS

The drawings included herein provide a further understanding of the invention. A brief introduction of the drawings is as follows.

DETAILED DESCRIPTION

To provide a further understanding of the invention, the following detailed description illustrates embodiments and examples of the invention, this detailed description being provided only for illustration of the invention.

Figures 1A, 1B:
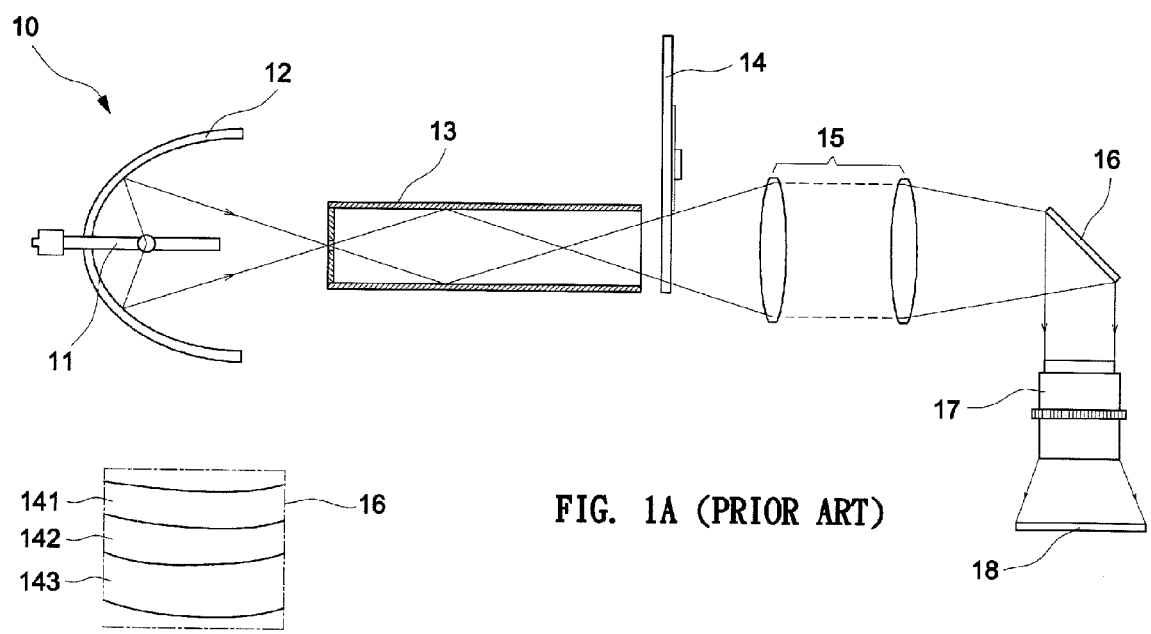
FIG. 1A is a schematic view of a conventional optical projection system.
FIG. 1B is a schematic view showing rectangular color stripe patterns formed by projecting lights on a light valve.
Figure 2:
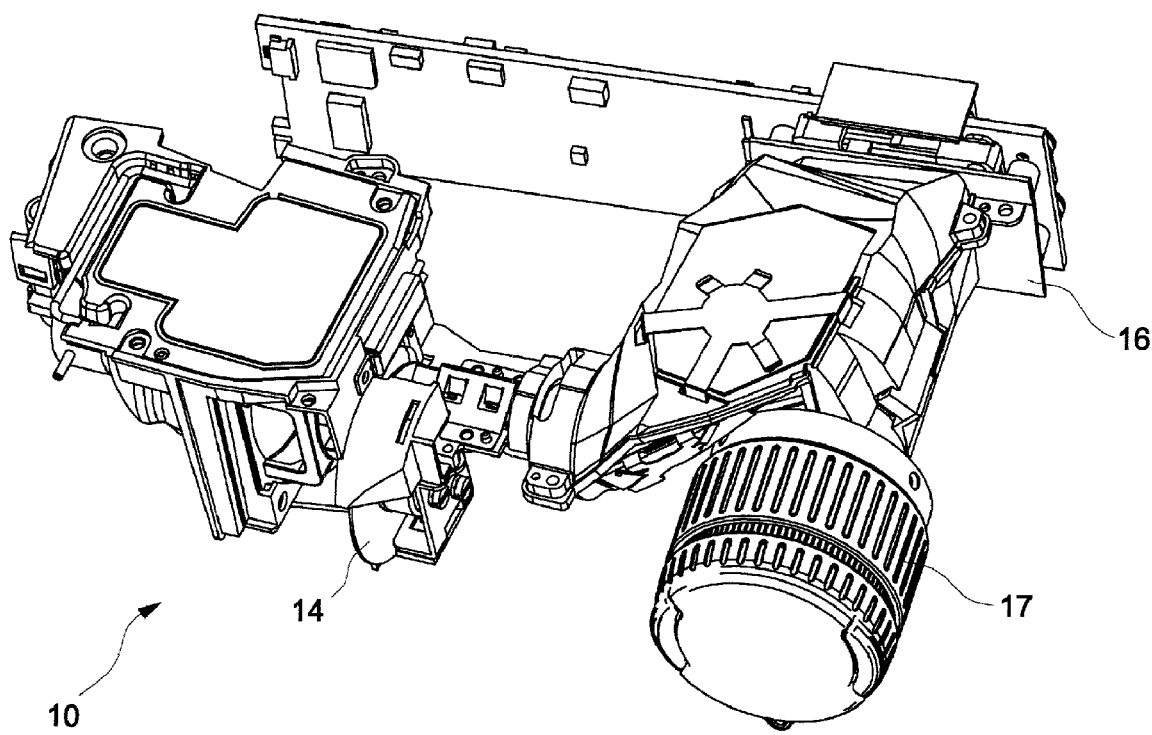
FIG. 2 is a perspective view of a conventional optical projection module.
Figure 3:
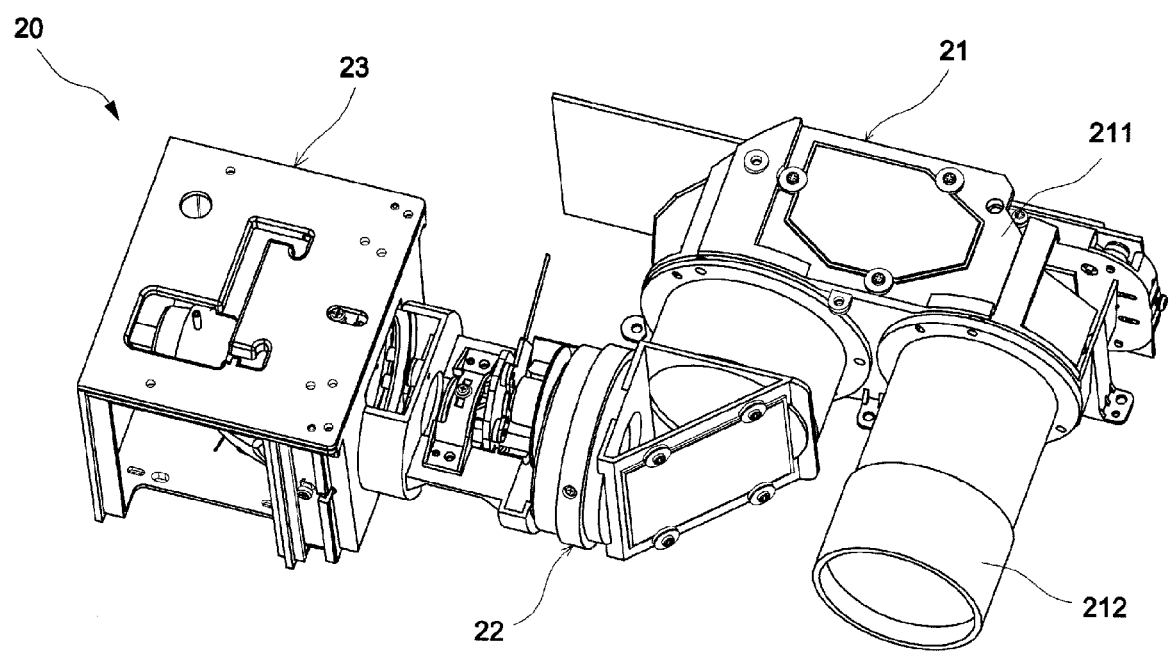
FIG. 3 is a perspective view of an optical projection module after assembling according to one embodiment of the invention.
Figure 4:
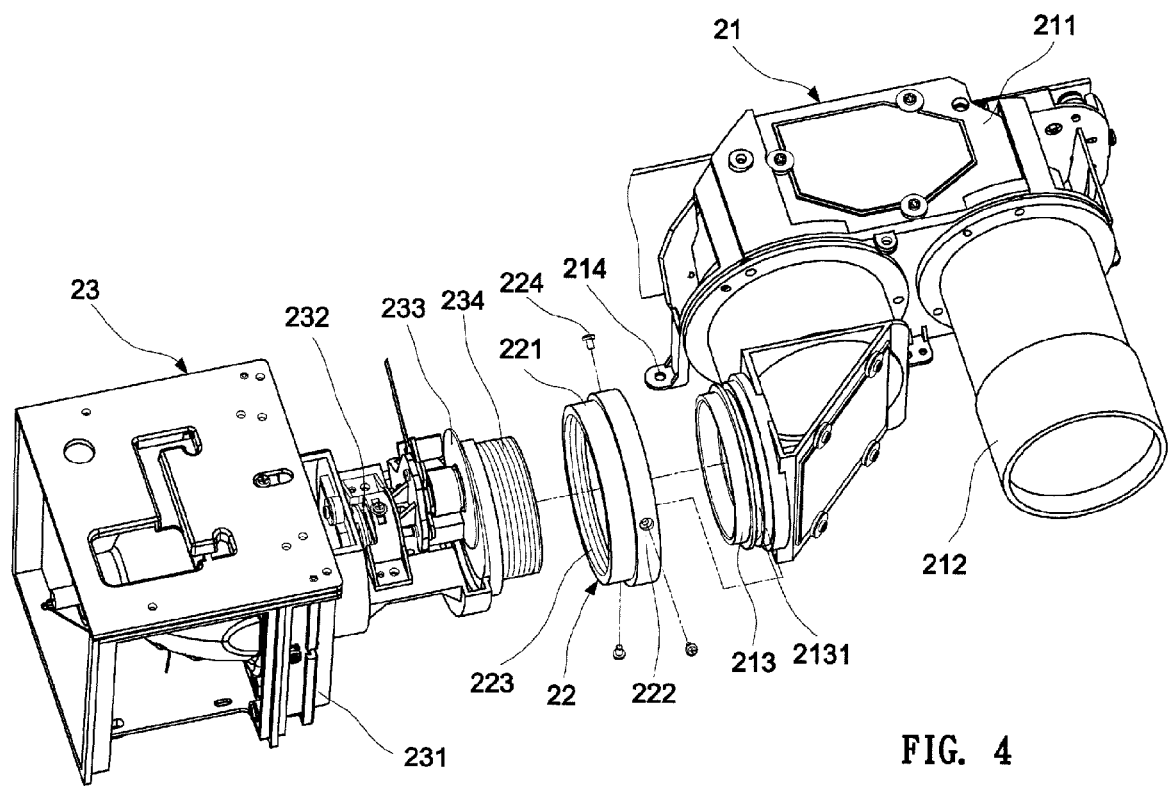
FIG. 4 is an exploded view of an optical projection module according to one embodiment of the invention.

Referring to FIG. 3 and FIG. 4, an optical projection module 30 includes a front optical module 21, a rear optical module 23, and an adjustment member 22. The adjustment member 22 is mounted between the front optical module 21 and the rear optical module 23 for adjusting a relative position of the front and rear optical modules.

The front optical module 21 includes a light valve 211 and a projection lens 212. One end of the module 21 further has a cylindrical connecting section 213. An annular groove 2131 is formed along an outer periphery of the connecting section 213. The center of the annular groove 2131 is on the optical axis of the front optical module 21.

A plurality of fixing holes 214 are formed on the front optical module 21 to fix the front optical module 21 to a projection display (not shown).

The adjustment member 22 has a cylindrical hollow body 221. A plurality of screw holes 222 are formed through the body 221, along an outer periphery of one end of the body 221. Inner threads 223 are formed at the other end of the body 221. The body 221 is co-axial with the optical axis of the front optical module 21. By means of fasteners 224 being screwed to the screw holes 222, one end of the adjustment member 22 is pivotally mounted in the annular groove 2131 to enable free rotation of the adjustment member 22 around the optical axis.

The rear optical module 23 includes a lighting module 231, an integrated rod 232 and a color wheel 233. The module 23 has an adjusting section 234 at its front end. The adjusting section 234 has outer threads matching the inner threads 223 of the adjustment member 22. The rear optical module 23 is screwed to the adjustment member 22. The adjusting section 234 is hollow so that lights from the color wheel 233 are projected on the light valve 211 of the front optical module 21. The color wheel 233 is, for example, a monochromic filter of red, green or blue color. The shape of the color wheel 232 may be, for example, a helix or fan.

According to one embodiment of the invention, one end of the adjustment member 22 is pivotally mounted to the front optical module 21, and the other end of the adjustment member 22 is screwed to the rear optical module 23 to form the optical projection module 20. The lighting module 231 emits light beams to pass through the integrated rod 232 for uniformization and the color wheel 233. The color wheel 233 outputs red, green and blue lights to project on the screen (not shown) via the projection lens 212. When lights cannot be clearly projected on the light valve 211, the adjustment member 22 rotates around the optical axis using the annular groove 21 as a rotating point. With the engagement of the inner threads 223 of the adjustment member 22 with the outer threads of the adjusting section 234, the rear optical module 23 is driven to linearly move along the optical axis. After the relative position of the rear optical module 23 and the front optical module 21 is adjusted, lights are clearly projected on the light valve 211.

As described above, by means of the adjustment member 22, color lights from the color wheel 233 are clearly projected on the light valve 211, thereby reducing the overlap of color lights on the light valve 211, and simplifying the digital signal processing without abandoning digital signals at any areas. Loss of luminance is therefore reduced.

Furthermore, the location of optical elements such as the lighting module 231 or the light valve 211 is optionally adjusted. The optical projection module may include a plurality of modules that are linked by one or more adjustment members 22 to achieve correction of optical paths and improvement of optical quality.

It should be apparent to those skilled in the art that the above description is only illustrative of specific embodiments and examples of the invention, and modifications in the structure can be suggested from the description herein. For example, one end of the adjustment member alternatively may be screwed to the front optical module and the other end is pivotally mounted to the rear optical module. The invention therefore should cover various modifications and variations made to the herein-described structure and operations of the invention, provided they fall within the scope of the invention as defined in the following appended claims.

What is claimed is:

1. An optical projection module, comprising:
   a front optical module;
   a rear optical module, located at one end of the front optical module; and
   an adjustment member, mounted between the front optical module and the rear optical module for adjusting a relative position of the front and rear optical modules, wherein a first end of the adjustment member is pivotally mounted to the front optical module, and a second end is screwed to the rear optical module.

2. The optical projection module of claim 1, wherein the front optical module includes a light valve and a projection lens.

3. The optical projection module of claim 1, wherein the rear optical module includes a light module, an integrated rod and a color wheel.

4. The optical projection module of claim 1, wherein the front optical module further includes a light valve, and the rear optical module further includes a light module to provide light beams, the light beams being clearly projected on the light valve by adjusting the relative position of the front optical module and rear optical module using the adjustment member.

5. The optical projection module of claim 1, wherein the adjustment member is a hollow cylinder.

6. The optical projection module of claim 1, wherein the front and rear optical modules respectively have a cylindrical end at corresponding locations.

7. The optical projection module of claim 1, wherein the front optical module and the adjustment member respectively have an annular groove at corresponding locations, and a plurality of screw holes being formed along an outer periphery of the adjustment member, thereby with screwing fasteners engaging the screw holes, one end of the adjustment member is pivotally mounted in the annular groove.

8. The optical projection module of claim 1, wherein the rear optical module has outer threads at one end thereof, and the adjustment member has inner threads matching the outer threads of the rear optical module.

9. An optical projection module, comprising:
   a front optical module;
   a rear optical module, located at one end of the front optical module; and
   an adjustment member, mounted between the front optical module and the rear optical module for adjusting a relative position of the front and rear optical modules, wherein the adjustment member is a hollow cylinder.

10. The optical projection module of claim 9, wherein the front and rear optical modules respectively have a cylindrical end at corresponding locations.

11. The optical projection module of claim 9, wherein the front optical module and the adjustment member respectively have an annular groove at corresponding locations, and a plurality of screw holes being formed along an outer periphery of the adjustment member, thereby with screwing fasteners engaging the screw holes, one end of the adjustment member is pivotally mounted in the annular groove.

12. The optical projection module of claim 9, wherein the rear optical module has outer threads at one end thereof, and the adjustment member has inner threads matching the outer threads of the rear optical module.

* * * * *